(12) United States Patent
Greifeneder et al.

(10) Patent No.: US 8,402,443 B2
(45) Date of Patent: Mar. 19, 2013

(54) METHOD AND SYSTEM FOR AUTOMATED ANALYSIS OF THE PERFORMANCE OF REMOTE METHOD INVOCATIONS IN MULTI-TIER APPLICATIONS USING BYTECODE INSTRUMENTATION

(75) Inventors: Bernd Greifeneder, Linz (AT); Christian Schwarzbauer, Linz (AT)

(73) Assignee: dyna Trace software GmbH (AT)

( * ) Notice: Subject to any disclaimer, the term of this patent is extended or adjusted under 35 U.S.C. 154(b) by 1517 days.

(21) Appl. No.: 11/502,660

(22) Filed: Aug. 11, 2006

(65) Prior Publication Data

US 2007/0169055 A1    Jul. 19, 2007

Related U.S. Application Data

(60) Provisional application No. 60/597,576, filed on Dec. 12, 2005.

(51) Int. Cl.
*G06F 9/44* (2006.01)
(52) U.S. Cl. .................... 717/128; 717/127; 717/129
(58) Field of Classification Search ................... None
See application file for complete search history.

(56) References Cited

U.S. PATENT DOCUMENTS

| | | | | |
|---|---|---|---|---|
| 5,432,932 A * | 7/1995 | Chen et al. | ..... | 718/103 |
| 5,727,147 A * | 3/1998 | van Hoff | ..... | 709/200 |
| 5,781,778 A * | 7/1998 | Meier et al. | ..... | 717/127 |
| 5,794,046 A * | 8/1998 | Meier et al. | ..... | 717/128 |
| 5,867,712 A * | 2/1999 | Shaw et al. | ..... | 717/127 |
| 5,933,639 A * | 8/1999 | Meier et al. | ..... | 717/129 |
| 5,953,530 A * | 9/1999 | Rishi et al. | ..... | 717/127 |
| 6,101,524 A * | 8/2000 | Choi et al. | ..... | 718/102 |
| 6,102,966 A | 8/2000 | Tyma | | |
| 6,134,603 A * | 10/2000 | Jones et al. | ..... | 719/330 |
| 6,145,121 A * | 11/2000 | Levy et al. | ..... | 717/135 |
| 6,151,639 A * | 11/2000 | Tucker et al. | ..... | 719/316 |
| 6,202,199 B1 * | 3/2001 | Wygodny et al. | ..... | 717/125 |
| 6,332,212 B1 * | 12/2001 | Organ et al. | ..... | 717/128 |
| 6,721,941 B1 * | 4/2004 | Morshed et al. | ..... | 717/127 |
| 6,760,903 B1 * | 7/2004 | Morshed et al. | ..... | 717/130 |
| 6,795,962 B1 * | 9/2004 | Hanson | ..... | 717/129 |
| 6,862,711 B1 * | 3/2005 | Bahrs et al. | ..... | 715/205 |
| 6,961,926 B2 * | 11/2005 | Koyama | ..... | 717/129 |
| 6,968,540 B2 | 11/2005 | Beck | | |
| 7,124,404 B1 * | 10/2006 | Bebout et al. | ..... | 717/127 |
| 7,162,710 B1 * | 1/2007 | Edwards et al. | ..... | 717/111 |

(Continued)

OTHER PUBLICATIONS

Parker Abercrombie et al., "jContractor: Bytecode Instrumentation Techniques for Implementing Design by Contract in Java", UCSB, Aug. 2004, <http://jcontractor.sourceforge.net/doc/Contractor_RV02.pdf> pp. 1-25.*

(Continued)

*Primary Examiner* — Thuy Dao
*Assistant Examiner* — Samuel Hayim
(74) *Attorney, Agent, or Firm* — Robert Plotkin, P.C.

(57) ABSTRACT

A method and system monitor and diagnose the performance of remote method invocations using bytecode instrumentation in distributed multi-tier applications. The method and system use automated instrumentation of client application bytecode and server application bytecode with sensors to measure performance of remote method invocations and operations performed during remote method invocations. Performance information is captured for each remote method invocation separately, allowing performance diagnosis of multithreaded execution of remote method invocations, so that throughput and response time information are accurate even when other threads perform remote method invocations concurrently. The captured performance metrics include throughput and response time of remote method invocation, object serialization, and transport. The performance metrics are captured per remote method invocation. Performance metrics may be sent to a processing unit for storage, analysis, and correlation.

18 Claims, 11 Drawing Sheets

U.S. PATENT DOCUMENTS

| | | | | |
|---|---|---|---|---|
| 7,237,230 B2* | 6/2007 | Underseth et al. | | 717/127 |
| 7,263,689 B1* | 8/2007 | Edwards et al. | | 717/127 |
| 7,293,259 B1* | 11/2007 | Dmitriev | | 717/130 |
| 7,293,260 B1* | 11/2007 | Dmitriev | | 717/130 |
| 7,367,025 B1* | 4/2008 | Nikolov et al. | | 717/158 |
| 7,376,940 B1 | 5/2008 | Bush | | |
| 7,496,903 B2 | 2/2009 | Rees | | |
| 7,500,227 B1* | 3/2009 | Fontana et al. | | 717/127 |
| 7,506,315 B1* | 3/2009 | Kabadiyski et al. | | 717/128 |
| 7,552,424 B1* | 6/2009 | Bischof et al. | | 717/127 |
| 7,634,759 B2* | 12/2009 | Calsyn et al. | | 717/129 |
| 7,647,589 B1* | 1/2010 | Dobrovolskiy et al. | | 717/129 |
| 7,739,661 B2* | 6/2010 | Garzia et al. | | 717/129 |
| 7,818,721 B2 | 10/2010 | Sundararajan | | |
| 2001/0004766 A1* | 6/2001 | Koyama | | 717/128 |
| 2002/0032754 A1* | 3/2002 | Logston et al. | | 709/219 |
| 2002/0174415 A1* | 11/2002 | Hines | | 717/127 |
| 2002/0199173 A1* | 12/2002 | Bowen | | 717/129 |
| 2003/0056200 A1* | 3/2003 | Li et al. | | 717/128 |
| 2004/0010570 A1* | 1/2004 | Kaler et al. | | 709/220 |
| 2004/0093588 A1* | 5/2004 | Gschwind et al. | | 717/130 |
| 2005/0039171 A1* | 2/2005 | Avakian et al. | | 717/127 |
| 2005/0039172 A1* | 2/2005 | Rees et al. | | 717/130 |
| 2005/0039186 A1* | 2/2005 | Borkan | | 719/310 |
| 2005/0039187 A1* | 2/2005 | Avakian et al. | | 719/310 |
| 2005/0039190 A1* | 2/2005 | Rees et al. | | 719/316 |
| 2005/0086656 A1 | 4/2005 | Whitlock | | |
| 2005/0223367 A1* | 10/2005 | Smith et al. | | 717/128 |
| 2005/0278706 A1* | 12/2005 | Garza et al. | | 717/128 |
| 2006/0069682 A1* | 3/2006 | Fanous et al. | | 707/8 |
| 2006/0242627 A1* | 10/2006 | Wygodny et al. | | 717/128 |
| 2006/0271395 A1* | 11/2006 | Harris et al. | | 705/1 |
| 2006/0271542 A1* | 11/2006 | Harris et al. | | 707/8 |
| 2006/0271575 A1* | 11/2006 | Harris et al. | | 707/100 |
| 2006/0271930 A1* | 11/2006 | Letizi et al. | | 718/1 |
| 2006/0271931 A1* | 11/2006 | Harris et al. | | 718/1 |
| 2007/0006165 A1* | 1/2007 | Lam et al. | | 717/128 |
| 2007/0011667 A1* | 1/2007 | Subbiah et al. | | 717/148 |
| 2007/0069005 A1* | 3/2007 | Dickerson et al. | | 235/379 |
| 2007/0088762 A1* | 4/2007 | Harris et al. | | 707/201 |
| 2007/0143323 A1* | 6/2007 | Vanrenen et al. | | 707/101 |
| 2007/0143743 A1* | 6/2007 | Cobb et al. | | 717/127 |
| 2007/0169055 A1* | 7/2007 | Greifeneder | | 717/158 |
| 2007/0180439 A1 | 8/2007 | Sundararajan | | |

OTHER PUBLICATIONS

Mikhail Dmitriev, "Selective Profiling of Java Applications Using Dynamic Bytecode Instrumentation", IEEE, 2004, <http://ieeexplore.ieee.org/stamp/stamp.jsp?tp=&arnumber=1291366> pp. 141-151.*

Mikhail Dmitriev, "Design of JFluid: A Profiling Technology and Tool Based on Dynamic Bytecode Instrumentation", Sun Microsystems, 2003, <http://delivery.acm.org/10.1145/1700000/1698171/smli_tr-2003-125.pdf> pp. 1-22.*

Genady Beryozkin, "RMI Plug-in for Eclipse version 2.0", RMI, May 20, 2006, <http://www.genady.net/rmi/v20/docs/spy/spy_effects.html>, pp. 1-3.*

Grigore Rosu et al., "An Instrumentation Technique for Online Analysis of Multithreaded Programs", IEEE, 2004, <http://ieeexplore.ieee.org/stamp/stamp.jsp?tp=&arnumber=1303344> pp. 1-8.*

Mick Jordan et al., "Proceedings of the Second International Workshop on Persistence and Java", Sun Microsystems, Dec. 1997, <http://delivery.acm.org/10.1145/980000/974967/smli_tr-97-63.pdf>, pp. 1-177.*

* cited by examiner

FIG 1: Remote Method Invocation Architecture

FIG 2: Instrumentation Meta-Information

FIG 3: Load-Time Instrumentation

FIG 4: Run-Time Instrumentation

FIG 5: Remote Method Call Sensor Operations

FIG 7: Serialization Sensor Operations

FIG 8: Interaction of Sensors with RPD-TLS

FIG 9: Remote Performance Diagnostics TLS (RPD-TLS)

METHOD AND SYSTEM FOR AUTOMATED ANALYSIS OF THE PERFORMANCE OF REMOTE METHOD INVOCATIONS IN MULTI-TIER APPLICATIONS USING BYTECODE INSTRUMENTATION

PRIORITY

The present invention claims priority under 35 USC section 119 based on provisional application Ser. No. 60/597,576 filed on Dec. 12, 2005.

FIELD OF THE INVENTION

The present invention relates to computer software and more particularly to methods, systems, computer program products, and methods of doing business whereby programmatically-generated bytecode insertion is used to perform run-time analysis of performance of remote method invocations.

BACKGROUND OF THE INVENTION

Object oriented and bytecode based software development platforms, including Sun Microsystems's Java and Microsoft's NET platform, have gained wide acceptance for developing Internet and Enterprise class software applications. Bytecode based software provides cross-platform and cross-language compatibility and eases the networked integration of software applications.

The above platforms further provide frameworks, including Sun Microsystems's RMI and Microsoft's NET Remoting, for invoking methods of remote objects and computers transparently. Remote method invocation frameworks hide the complexity and mechanics for preparing request and response messages, serializing arguments and return values, setting up and managing network connections, transporting the message over network links, and dispatching method invocations based on the request message. While the frameworks greatly simplify programming remote method invocations and stow away complexity, programmers frequently oversee costly usage of said remote invocations, causing poor performance and scalability.

Application performance is often a critical business factor and as such subject to optimization. Remote method invocations can significantly contribute to poor performance. Therefore, monitoring and diagnosing performance of remote method invocations is required to optimize source code, software architecture, and configuration of networked software applications.

There are several known types of monitoring remote method invocations. One of them is sniffing packets at the network level. Such network sniffing tools see due to their nature applications as a black-box and consequently lack application context information, which is required to relate remote method invocations to application internals. Another limitation of network sniffers is that they cannot alter the remote method invocations message, which prevents adding trace tags to the remote method invocation message. Also network sniffers cannot see remote method invocations if they are sent over encrypted communication channels.

Another type of monitoring tool is based on remote management protocols, including but not limited to SNMP, JMX, WBEM. Such remote management protocols are used to query aggregated performance information by use of monitoring agents. Monitoring agents require source code modifications for instrumenting the application. Due to the generic nature, performance metrics provided through such management interfaces are aggregated over different types and occurrences of remote method invocations. Furthermore, available performance metrics are pre-built into the application and cannot be changed at run-time. These metrics cannot be associated to particular application transactions that are on-the fly.

Another known type of monitoring remote method invocations is to enable remote method invocation logging of said application development frameworks. These log messages are intended for diagnosing remote method invocation errors rather than for diagnosing remote method invocation performance. As such, they lack required performance information including but not limited to message size, serialization cost information. Furthermore, log events are restricted to built-in events of the applications runtime platform.

A manual approach to capturing performance information of remote invocation calls is to add generation of log messages to the application source code. Modifying application source code requires deep programming and performance measurement knowledge, which may not be available in all situations where performance measurement is required. Altering the source code can introduce undesired application defects. Furthermore, access to source code is often not available. Altered source code of applications must be recompiled and redeployed. Redeployment may also require an undesired restart of the application, which in turn may increase application downtime.

Accordingly, a need exists for overcoming these shortcomings of the prior art.

SUMMARY OF THE INVENTION

The present invention is directed to a system and method for capturing performance metrics of distinct remote method invocations in networked software applications to enable performance diagnosis and performance bottleneck root-cause analysis in production and load test environments. Its objective is to capture the performance metrics for single remote method calls.

The present invention captures the performance metrics in a manner that provides minimal disruption to the execution characteristics of the application.

The present invention does not require access to source code for capturing remote method invocation performance metrics from bytecode based software applications.

Another object of the present invention is to provide techniques for programmatically instrumenting the bytecode of applications during load-time and run-time so that performance metrics about distinct remote method invocations will be captured.

The above performance metrics preferably include but are not limited to bytes send, bytes received, objects serialized, objects deserialized, objects visited for serialization, objects visited for deserialization, remote method invocation response time at the stub, remote method invocation response time at the dispatcher.

Instrumenting software applications for the purpose of performance diagnosing remote method invocations using a first method preferably includes: intercepting load requests for original bytecode at run-time; programmatically altering original bytecode by inserting additional bytecode (the altered and added bytecode is further called sensors) to identified methods; loading for each intercepted load request the altered bytecode in place of the original bytecode.

Alternatively, instrumenting software applications for the purpose of performance diagnosing remote method invocations using a second method preferably includes: loading original bytecode at run-time; programmatically altering loaded original bytecode by inserting additional bytecode to methods that implement remote method invocation interfaces; and to methods that send/receive remote method invocation over network streams; and to methods that serialize/ deserialize objects; redefining original bytecode by altered bytecode at run-time.

When instrumented remote methods are invoked, the altered bytecode (sensors) gets an existing or creates a new remote performance diagnostics thread-local-storage (RPD-TLS) object for the current thread in which the method is running. A thread-local-storage object is a global variable, of which the accessibility scope is restricted to the single thread in which it has been created, allowing multiple threads to create their own copy of the same variable type. The RPD-TLS object preferably includes variables for holding performance metrics; variables for correlating the invoked method with the message send/receive streams, variables for correlating the invoked method with serialization/deserialization streams, variables for control and status information.

During the execution of the remote method call, the altered bytecode (sensors) collects performance metrics and writes them to the RPD-TLS of the current thread. The RPD-TLS may contain further control and status information that sensors can evaluate and use to change behavior and method call correlation.

On completion of the remote method invocation, the collected performance metrics are preferably stored for further analysis. Storing performance metrics may include transfer over network connections, writing to file, and storing in memory.

The technique may further include selectively deactivating performance measurement of one or more instrumented remote method invocations.

Capturing performance information of remote method invocations may occur on client as well as on the server side of the remote communication.

DESCRIPTION OF EXEMPLARY EMBODIMENTS

Historically, it has been difficult to provide tools to diagnose the root-cause for poor performing remote invocation calls, since most existing tools rely on network based information, which lack an application context. The present invention, on the other hand, discloses a relatively lightweight approach to diagnosing the performance of remote method invocations, which is applicable also in load-testing and production scenarios.

In the Java platform's distributed object model, a remote object is one whose methods can be invoked from another Java virtual machine, potentially on a different host. An object of this type is described by one or more remote interfaces which are interfaces written in the Java programming language that declare the methods of the remote object.

Remote method invocation (RMI) is the action of invoking a method of a remote interface on a remote object. Most importantly, a method invocation on a remote object has the same syntax as a method invocation on a local object.

Figure 1:
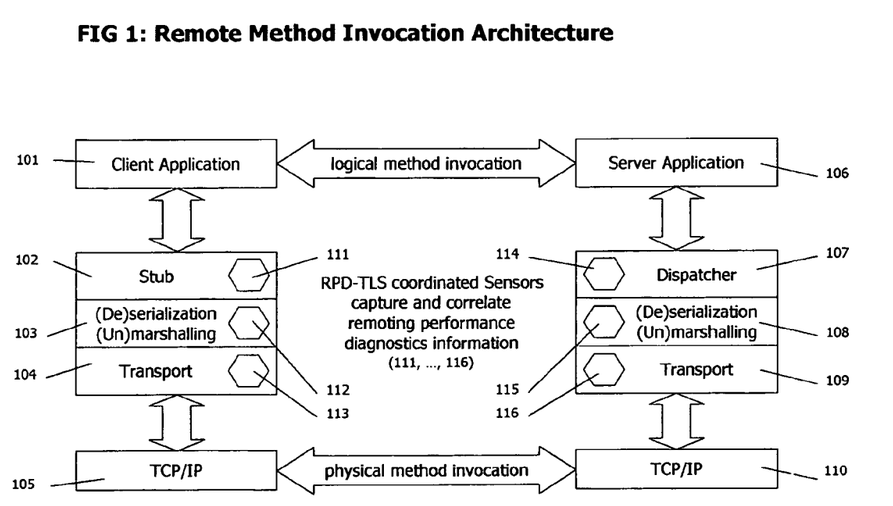
FIG. 1 illustrates a block diagram illustrating the principle components of a remote method invocation occurring between a client and a server and the preferred locations of injected remoting performance diagnostics sensors after instrumentation.

Referring now to FIG. 1, therein is shown a principle diagram for a remote method invocation using Java RMI between a client application 101 and a server application 106. The client application 101 and server application 106 can be of any bytecode based application type, including but not limited to a rich-client, a web-server, an application server. From the perspective of the application, the remote method invocation is similar to a local invocation. Thus, the client application 101 performs logically a direct method invocation on the remote server application 106. FIG. 1 illustrates further the layers of the client application 101 and server application 106 that are involved into the remote method invocation. Code of the client application 101 transparently invokes a stub method 102 with the same syntax as the actual remote method that will be invoked. The stub 102 serializes method arguments and deserializes method return values by making use of the (de)serialization/(un)marshalling layer 103, which in turn uses the transport layer 104 to send a remote method invocation request containing the method arguments. The request is physically transferred preferably over a TCP/IP network connection 105 to and from the server application. The clients transport layer 104 now blocks the current thread until the server replies with a response or a network failure or timeout occurs. The server application 106 runs a TCP/IP listener 110 capable of accepting incoming remote method invocations request from client application 101. Incoming requests are escalated to the transport layer 109 which handles the request and forwards the request stream to the (de)serialization and (un)marshalling layer 108. The (de)serialization and (un)marshalling layer 108 then reconstructs the method arguments. The dispatcher 107 finally calls the remote method using provided method arguments. The dispatcher 107 waits for the remote method, which is executed each in its own thread within the server application 106. Once the remote method execution completed, the dispatcher 107 makes use of the serializer and marshaller in layer 108 which in turn uses the transport layer 109 to send the response to the client application 101 using the TCP/IP connection 110. The TCP/IP layer 105 of the client application 101 forwards the response to the transport layer 104 which reads the response and deserializes the response data stream in layer 103 to reconstruct the remote methods return value. The above return value is then returned by the stub 102 to the calling client application 101.

FIG. 1 illustrates further the preferred locations for sensors 111 through 116 that capture remote method invocation performance information for each single remote method invocation call. The sensors may be used at the client application 101, at the server application 106, or concurrently at both the client application 101 and the server application 106. Sensors 111 and 114 are of a remote method invocation type of sensor. Sensors 112 and 115 are of a serialization type sensor. Sensors 113 and 116 are of a transport type sensor. Sensors are blocks of bytecode that are injected into the application layers using preferred instrumentation technique shown in FIG. 3 and FIG. 4.

The exemplary embodiment describes remoting performance diagnostics using Java RMI/JRMP terminology. The present invention is not limited to Java RMI/JRMP and may be applied to other remote invocation methods that are based on bytecode execution including but not limited to Java Web Services, JMS, NET remoting.

Client applications 101 may use threads to perform remote method invocations concurrently. Server applications 106 use typically thread pools to accept and dispatch remote method invocations concurrently. Server applications 106 will serialize remote method invocations in case the maximum number of dispatcher threads has been reached. On the server application 106 side, when a client application 101 connects to the server socket, a new thread is forked to deal with the incoming call. The original thread can continue listening to the original socket so that additional calls from other clients can be made.

The stub 102 hides the serialization of parameters and the network-level communication in order to present a simple invocation mechanism to the caller.

Figure 9:
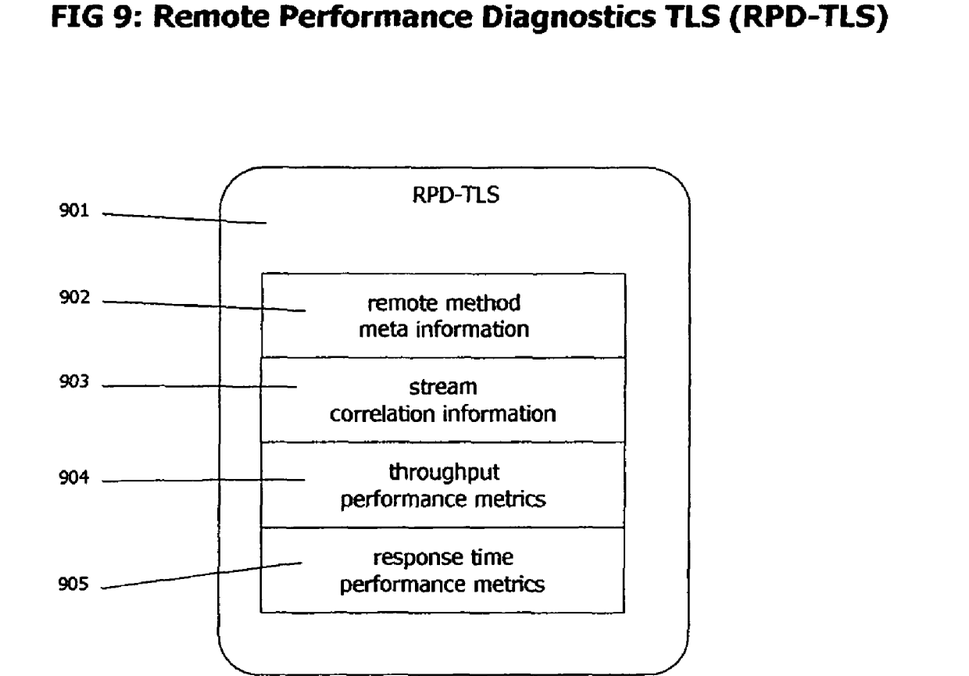
FIG. 9 illustrates remote performance diagnostics in accordance with the teachings of the present invention.

FIG. 9 illustrates the preferred embodiment of the remoting performance diagnostics thread-local storage (RPD-TLS) 901. The RPD-TLS 901 holds information on a per-thread basis and includes the groups 902 through 905. The remote method meta information 902 can hold meta information that is set by the instrumentation engine during instrumentation time. The above meta information 902 is used to identify a particular remote method invocation of the application. Stream correlation information 903 is used when transport or serialization streams overlap in the current thread during the remote method invocation. The above correlation information 903 is used in this case to identify the correct stream that is associated with the ongoing remote method invocation. Throughput performance metrics 904 include but are not limited to: number of serialized and marshaled objects; number of deserialized and unmarshalled objects; number of objects visited during serialization; number of objects visited during deserialization; number of bytes sent; number of bytes received; remote method invocation time at the stub 102 and at the dispatcher 107. Response time performance metrics 905 include but are not limited to: response time of the stub method invocation; response time of the dispatcher method invocation; elapsed time to serialize and deserialize the method arguments of the remote method call request; elapsed time to serialize and deserialize the method return value or exception of the remote method call response; elapsed exclusive time spent for serialization, excluding stream transport time.

Figure 2:
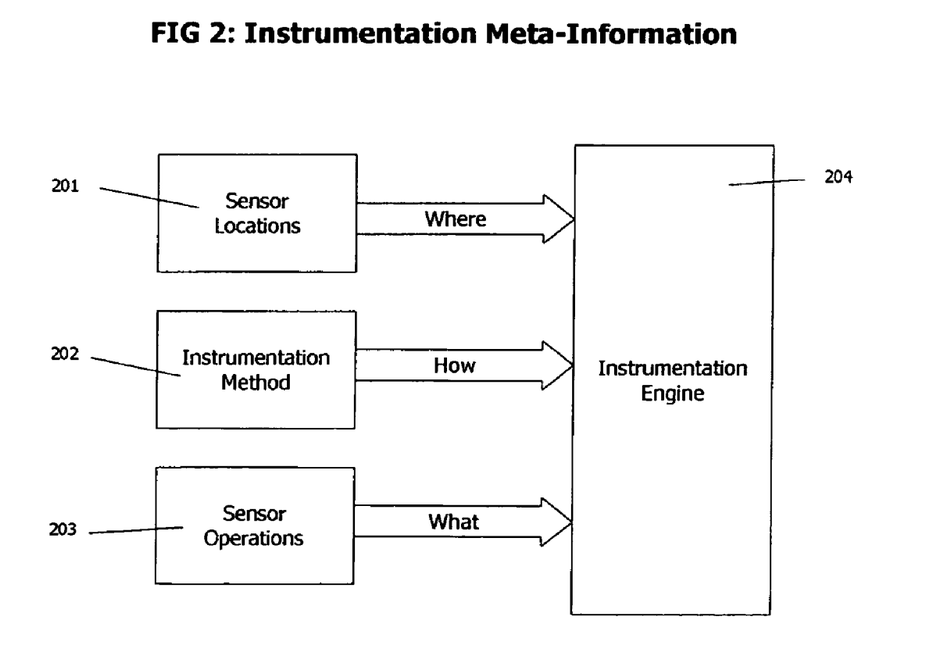
FIG. 2 illustrates how an instrumentation program may preferably use instrumentation meta-information for locating the methods that need to be instrumented and transformation logic that knows how to alter the bytecode for fulfilling desired sensor tasks.

FIG. 2 shows an exemplary method and system for configuring an instrumentation engine 204 using meta-information 201 through 203. The sensor locations 201 specify the method and code location for placing the sensors by preferably using predefined patterns. The instrumentation method 202 is an algorithm, preferably in the form of a software program, which defines how bytecode alterations have to be performed to correctly inject the sensors into the application layers. The sensor operations 203 define what the injected sensor needs to do in order to capture remote method performance information. The sensor operations preferably include bytecode targeted to the applications platform.

Figure 3:
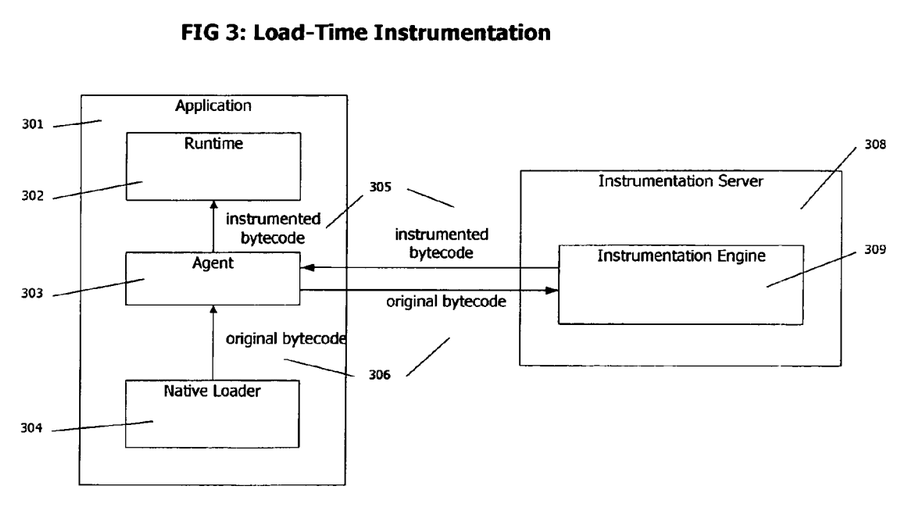
FIG. 3 illustrates a preferable embodiment for instrumenting the original bytecode at load time.
Figure 10:
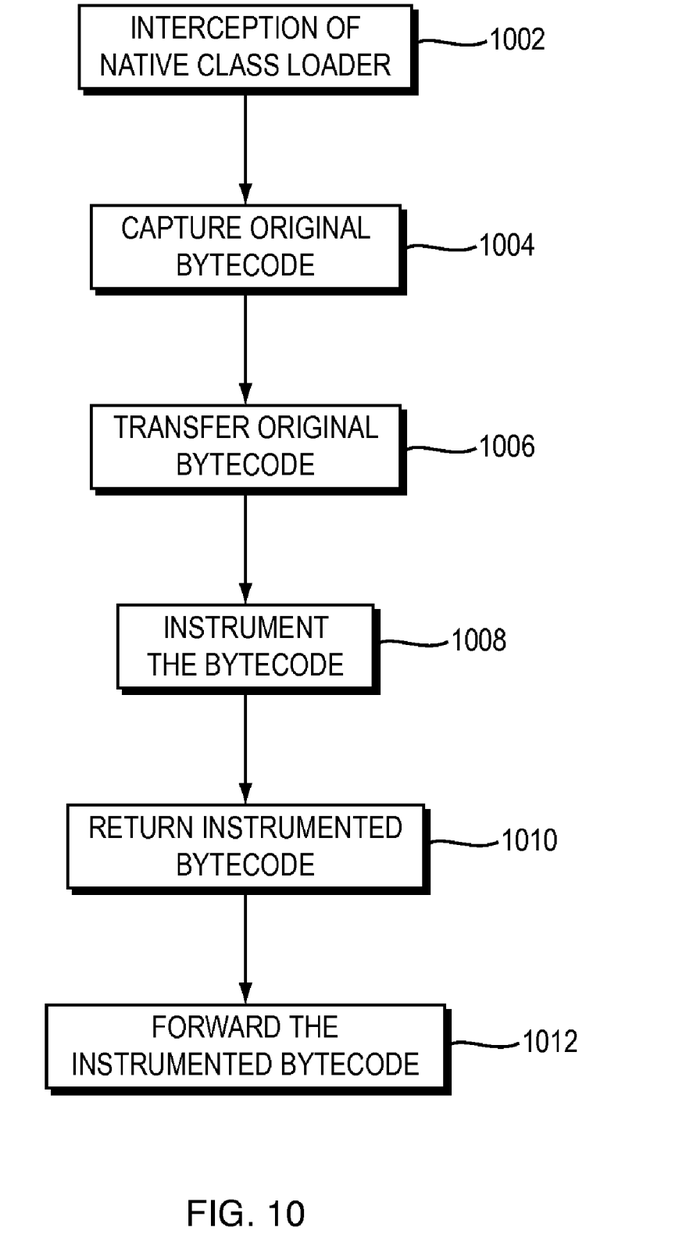
FIG. 10 illustrates a flow chart of the present invention.

Referring to FIG. 3, instrumenting a client or server application 301 at load time involves in preferred embodiment following steps as shown in the flowchart of FIG. 10: interception 1002 of the native class loader 304 using an agent 303; capturing 1004 the original bytecode 306 and transferring 1006 the original bytecode 306 to an instrumentation engine 309; instrumenting 1008 the bytecode in the instrumentation engine using meta-information as shown in FIG. 2.; returning 1010 the instrumented bytecode 305 to the agent 303, which in turn forwards 1012 the instrumented bytecode 305 to the application at runtime instead of the original bytecode 306.

Figure 4:
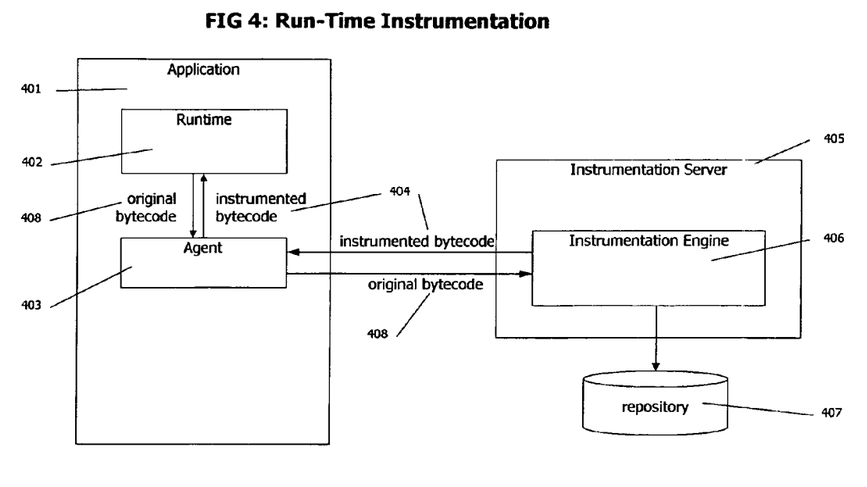
FIG. 4 illustrates a preferable embodiment for instrumenting the original bytecode at run-time.
Figure 11:
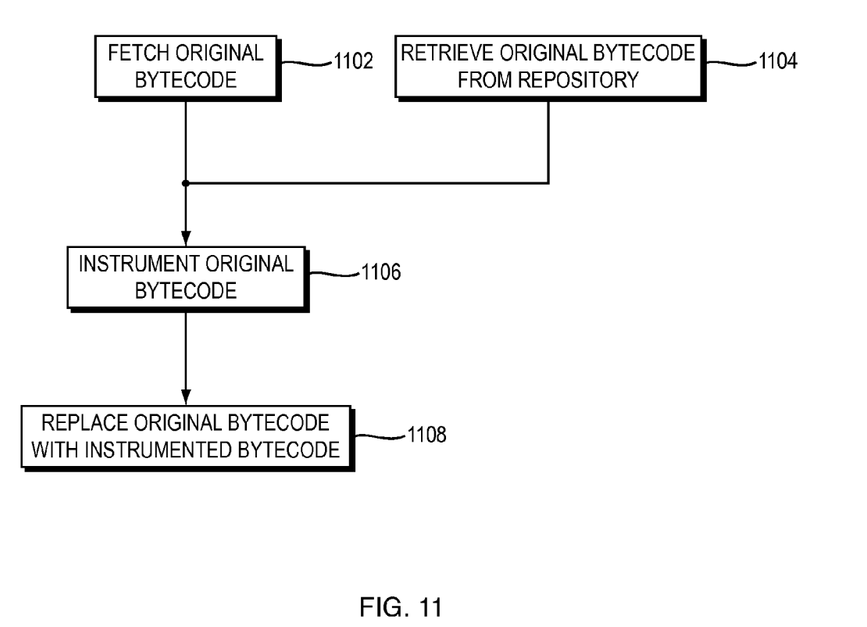
FIG. 11 illustrates a flow chart of the present invention.

Referring to FIG. 4, instrumenting a client or server application 401 at run-time allows adding or removing the remoting performance diagnostics sensors at run-time, without the need for an application restart. The present invention is architected to support run-time instrumentation using an instrumentation engine 406, which is preferably hosted by an out-of-process instrumentation server 405. The preferred embodiment includes following steps as shown in the flowchart of FIG. 11: the original bytecode 408 is fetched 1102 from the runtime 402 by making use of the agent 403; alternatively, the original bytecode 408 may be retrieved 1104 from a repository 407; in the next step the instrumentation engine 406 instruments 1106 the original bytecode 408 to include sensors as defined in the meta information as shown in FIG. 2; the resulting instrumented bytecode 404 is then sent to the agent 403, which replaces 1108 the original bytecode by the instrumented bytecode.

Serialization is defined as the process of deconstructing objects with variables and references to other objects and to a serial stream of objects and primitive type values. Deserialization is defined as the reconstruction of a stream of objects and primitive type values to a single object.

Marshalling is defined as the process of encoding an object and primitive type values to a byte sequence for transport and persistency. Unmarshalling is defined as the process of decoding a byte sequence to objects and primitive type values.

Figure 8:
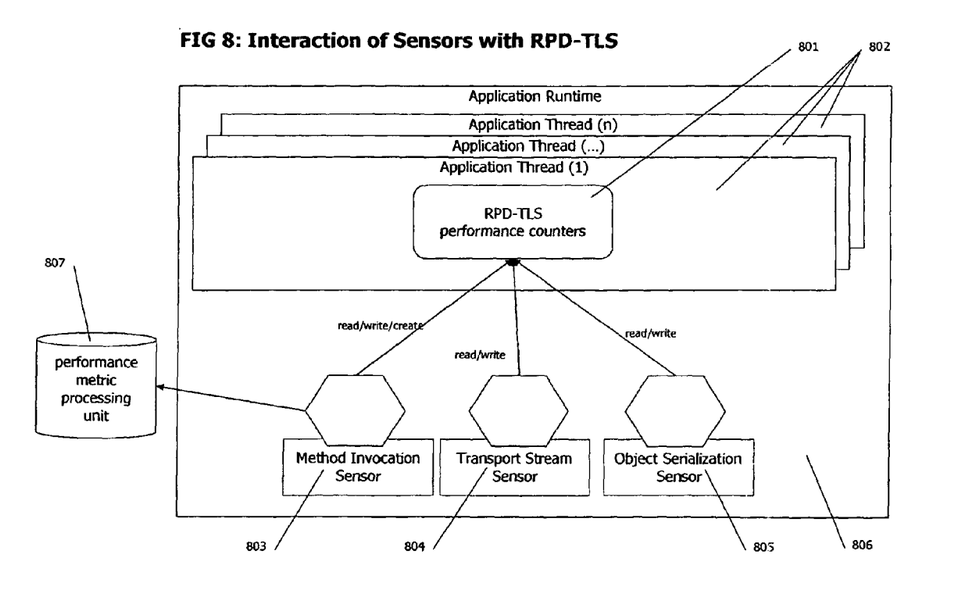
FIG. 8 illustrates the preferred groups of information within the thread local storage object that is used for capturing remote method invocation performance (RPD-TLS).

The sensors 201, 202, 203 that are injected into the original bytecode by the instrumentation engine 204 are can be categorized into three types. The three types of sensors are shown in FIG. 8. The first sensor type is the remote method invocation sensor 803, for which bytecode is placed into all or selected method stubs. Furthermore, the bytecode for this sensor type is also placed into the dispatcher method on the server side. The bytecode for the second sensor type is the object serialization sensor 805, which is placed into the bytecode of methods for object serialization and object deserialization. The third sensor type, the transport sensor 804, is placed into write and read methods of the remote method invocation transport stream bytecode. All three sensor types communicate through the RPD-TLS 901. The remote method invocation sensor type is preferably after completion of a single remote method invocation responsible for transferring the captured performance metrics to a metric processing unit 807 for storage, analysis, and correlation. The metric processing unit 807 may be contained in-process of the application as well as out-of-process in a performance processing server.

Figure 5A:
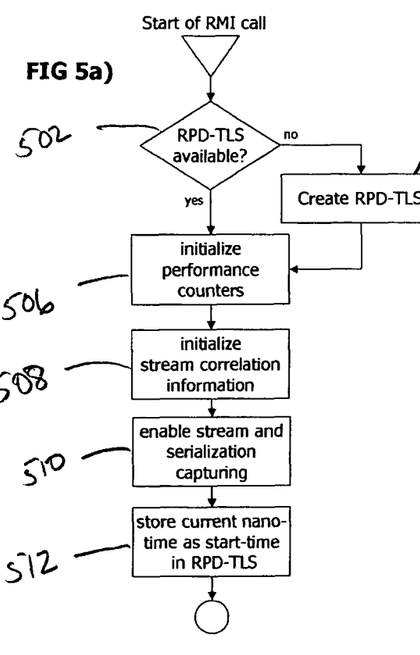
FIG. 5 provides flowcharts for the client side process of capturing performance metrics for a single remote method invocation.
Figure 5B:
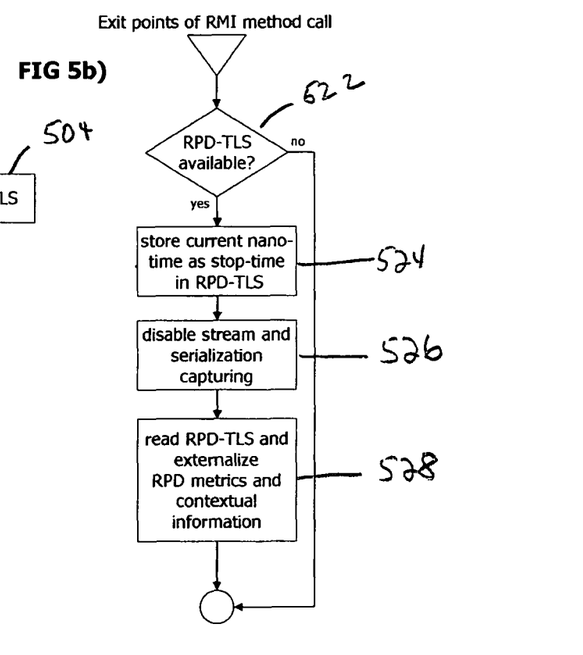

Referring to FIG. 5, the instrumentation engine 204 injects bytecode of the remote method invocation sensors at the beginning of the remote method stub as well as at all exit points. Exit points include: the end of the method, return statements, and exceptions. As shown in FIG. 5a, the remote method invocation sensor bytecode at the beginning of the method call preferably performs following operations:
1) checks 502 for the existence of the thread local storage variable that holds the RPD-TLS 901. If the RPD-TLS 901 does not yet exist within the current thread, a new one is created 504.
2) resets 506, 508 the RPD-TLS 901 to initial values, which preferably assigns a remote method identifier, increases a remote method call serial number, clears all remote method call performance metrics that are on a per-call basis.
3) enable capturing 510 of serialization/deserialization and transport streams by settings associated flags in RPD-TLS 901.
4) store 512 the current timestamp as method entry timestamp in the RPD-TLS 901.

The remote method invocation sensor bytecode at the exit points of the methods preferably performs following operations (also shown in FIG. 5b):
1) checks 522 for the existence of the thread local storage variable that holds the RPD-TLS 901. If the RPD-TLS 901 does not exist, skip remainder of the sensor bytecode.
2) store 524 the current timestamp as method exit timestamp in the RPD-TLS 901; the difference of the method entry and exit timestamp represent the remote method call response time.
3) disable 526 capturing of serialization/deserialization and transport streams by clearing associated flags in RPD-TLS 901.
4) read 528 the performance metrics from RPD-TLS 901 and forward them to a performance metric collection unit, which may store, correlate, analyze, aggregate, externalize these performance metrics.

Figure 6:
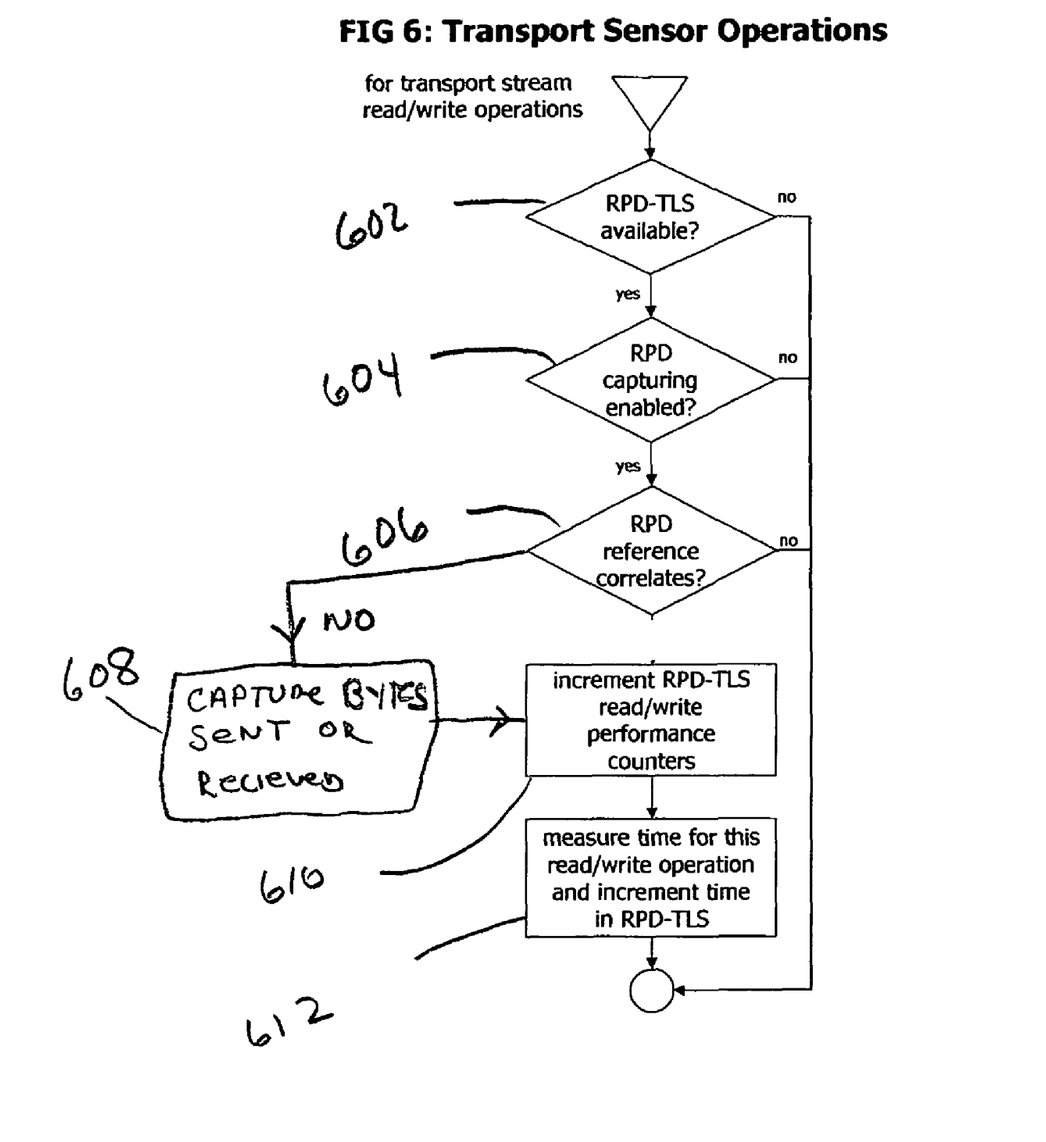
FIG. 6 provides flowcharts for the server side process of capturing performance metrics for a single remote method invocation.

The instrumentation engine preferably places further transport sensor bytecode into the remote method invocation transport stream for capturing read bytes and sent bytes. The transport sensor bytecode preferably performs operations shown in FIG. 6 and listed below:
1) checks 602 for existence of RPD-TLS 901; if RPD-TLS 901 is not available, skip remainder of sensor bytecode.
2) checks 604 whether capturing flag in RPD-TLS 901 is enabled if the flag is not set, skip remainder of sensor bytecode
3) checks 606 whether the current transport stream correlates with the remote method invocation by preferably comparing the transport stream object reference with an object reference stored in the RPD-TLS 901; if said stream reference does not match the one of the RPD-TLS 901, skip remainder of sensor bytecode.
4) captures 608 the number of bytes sent or received, depending whether the sensor bytecode is added to a sending or receiving method;
5) increments 610 the RPD-TLS transport read/write counters by captured value.
6) captures 612 the current time at the beginning of the transport stream method, captures the current time at the end of the transport stream method, and increments the elapsed transport time counter in the RPD-TLS by the difference of said timestamps.

Figure 7:
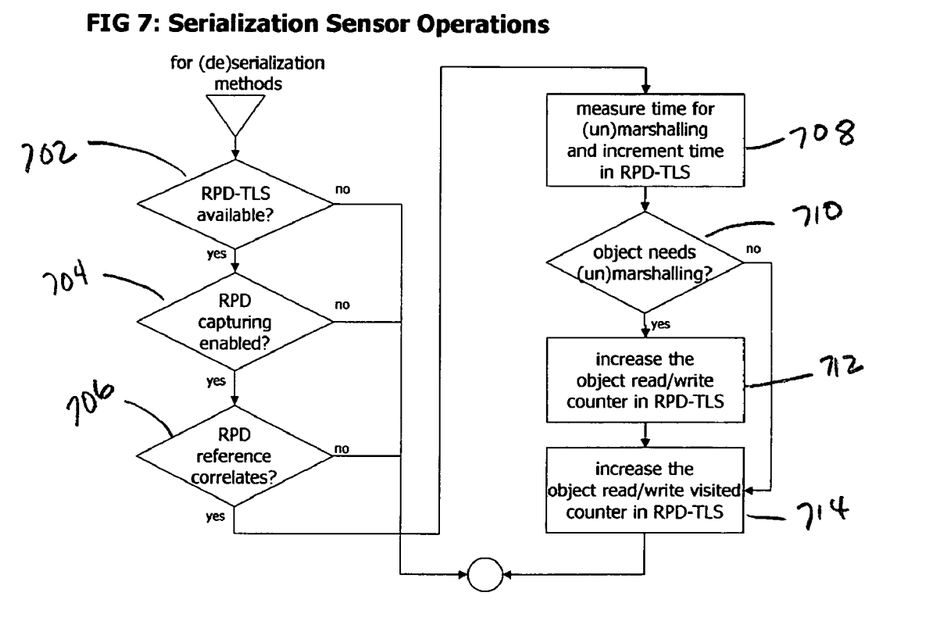
FIG. 7 illustrates the RPD-TLS that may be created for each thread and the sensors that access the TLS for storing captured performance metrics, for status and control, for correlation.

The instrumentation engine 204 preferably places further serialization sensor type bytecode into the object (de)serialization and (un)marshalling methods. The preferred operations this serialization sensor bytecode performs is shown in FIG. 7 and listed below:
1) checks 702 for existence of RPD-TLS 901 if RPD-TLS 901 is not available, skip remainder of sensor bytecode.
2) checks 704 whether capturing flag in RPD-TLS 901 is enabled if the flag is not set, skip remainder of sensor bytecode
3) checks 706 whether the current object serialization/deserialization stream correlates with the remote method invocation by preferably comparing the (de)serialization stream object reference with an object reference stored in the RPD-TLS; if said stream reference does not match the one of the RPD-TLS, skip remainder of sensor bytecode.
4) captures serialization/deserialization information as follows:
  a. if this is a method that (de)serializes an object: insert bytecode that
    captures 708 the current time at the beginning of the (de)serialization stream method, captures the current time at the end of the (de)serialization stream method, and increments the elapsed (de)serialization time counter in the RPD-TLS 901 by the difference of said timestamps.
  b. determines 710 if this is a method for (un)marshalling objects:
    increase 712 number of written/read objects in the RPD-TLS 901.
  c. if this is a method that analyzes object references for the need of (un)marshalling during traversal of the object (un)serialization tree: increase 714 the number of visited objects in the RPD-TLS 910.

The present invention may be further extended to provide metrics about each serialized object for pinpointing the most expensive object of the serialization process.

The invention claimed is:
1. A computer-implemented method for collecting performance metrics of a remote method invocation, the method comprising:
  capturing original bytecode;
  instrumenting said original bytecode with sensor bytecode to form instrumented bytecode;
  forwarding the instrumented bytecode to an application; and
  collecting said performance metrics based on execution of the sensor bytecode in a plurality of remote method invocations concurrently, comprising:
    using the sensor bytecode in a first remote method invocation to store a first subset of said performance metrics in a first thread-local-storage object for a first thread in which the first remote method invocation is running, wherein the first subset of said performance metrics are performance metrics for the first remote method invocation; and
    using the sensor bytecode in a second remote method invocation to store a second subset of said performance metrics in a second thread-local-storage object for a second thread in which the second remote method invocation is running, wherein the second subset of said performance metrics are performance metrics for the second remote method invocation,
  wherein said collecting includes collecting a portion of said performance metrics by a serialization sensor which counts the number of objects visited during serialization.

2. The method of claim 1, wherein the application executes on a client computer and wherein collecting comprises collecting said performance metrics based on execution of the sensor bytecode at the client computer.

3. A method for collecting performance metrics as in claim 1, wherein said instrumenting is performed by an instrumentation engine to generate the instrumented bytecode.

4. A method for collecting performance metrics as in claim 1, wherein instrumenting comprises retrieving said original bytecode from a repository and instrumenting the retrieved original bytecode to form the instrumented bytecode.

5. A method for collecting performance metrics as in claim 1, wherein said original bytecode is part of a distributed multi-tier application.

6. A method for collecting performance metrics as in claim 1, wherein said collecting includes collecting a portion of said performance metrics by a serialization sensor.

7. A method for collecting performance metrics as in claim 1, wherein said collecting includes collecting a portion of said performance metrics by a transport sensor which counts the number of read bytes and sent bytes.

8. The method of claim 1, wherein the application executes on a client computer, and wherein collecting comprises collecting said performance metrics based on execution of the sensor bytecode at a server computer.

9. The method of claim 1, wherein capturing comprises intercepting a load request from a native class loader and receiving the original bytecode.

10. The method of claim 1, wherein instrumenting comprises instrumenting the loaded original bytecode without requiring restart of the application.

11. A system including at least one of a client computer and a server computer for collecting performance metrics of a remote method invocation, the system comprising a computer readable medium having tangibly stored thereon computer-executable program instructions which, when executed by a computer processor, perform a method comprising:
  capturing original bytecode;
  instrumenting said original bytecode with sensor bytecode to form instrumented bytecode;
  forwarding the instrumented bytecode to an application; and
  collecting said performance metrics based on execution of the sensor bytecode in a plurality of remote method invocations concurrently, comprising:
    using the sensor bytecode in a first remote method invocation to store a first subset of said performance metrics in a first thread-local-storage object for a first thread in which the first remote method invocation is running, wherein the first subset of said performance metrics are performance metrics for the first remote method invocation; and
    using the sensor bytecode in a second remote method invocation to store a second subset of said performance metrics in a second thread-local-storage object for a second thread in which the second remote method invocation is running, wherein the second subset of said performance metrics are performance metrics for the second remote method invocation,
  wherein said collecting includes collecting a portion of said performance metrics by a serialization sensor which counts the number of objects visited during serialization.

12. The system of claim 11, wherein said instrumenting comprises using an instrumentation engine to generate the instrumented bytecode.

13. The system of claim 11, wherein instrumenting comprises retrieving said original bytecode from a repository and instrumenting the retrieved original bytecode to form the instrumented bytecode.

14. The system of claim 11, wherein said original bytecode is part of a distributed multi-tier application.

15. The system of claim 11, wherein said collecting comprises collecting a portion of said performance metrics by a transport sensor.

16. The system of claim 11, wherein the application executes on a client computer, and wherein collecting comprises collecting said performance metrics based on execution of the sensor bytecode at a server computer.

17. The system of claim 11, wherein capturing comprises intercepting a load request from a native class loader and receiving the original bytecode.

18. The system of claim 11, wherein instrumenting comprises instrumenting the loaded original bytecode without requiring restart of the application.

* * * * *

UNITED STATES PATENT AND TRADEMARK OFFICE
CERTIFICATE OF CORRECTION

PATENT NO.         : 8,402,443 B2
APPLICATION NO.    : 11/502660
DATED              : March 19, 2013
INVENTOR(S)        : Bernd Greifeneder et al.

It is certified that error appears in the above-identified patent and that said Letters Patent is hereby corrected as shown below:

On Title page, item (73), in "Assignee", in column 1, line 1, Delete "dyna Trace" and insert -- dynaTrace --, therefor.

In the Specification

In column 1, line 26, Delete "NET" and insert -- .NET --, therefor.

In column 1, line 32, Delete "NET" and insert -- .NET --, therefor.

In column 7, line 48, Delete "enabled" and insert -- enabled; --, therefor.

In column 7, line 49, After "bytecode" insert -- . --.

In column 8, line 4, Delete "901" and insert -- 901; --, therefor.

In column 8, line 7, Delete "enabled" and insert -- enabled; --, therefor.

In column 8, line 8, After "bytecode" insert -- . --.

Signed and Sealed this
Twentieth Day of August, 2013

Teresa Stanek Rea
*Acting Director of the United States Patent and Trademark Office*

UNITED STATES PATENT AND TRADEMARK OFFICE
CERTIFICATE OF CORRECTION

PATENT NO.        : 8,402,443 B2
APPLICATION NO.   : 11/502660
DATED             : March 19, 2013
INVENTOR(S)       : Bernd Greifeneder et al.

Page 1 of 1

It is certified that error appears in the above-identified patent and that said Letters Patent is hereby corrected as shown below:

In the Specification

In column 5, line 21, Delete "NET" and insert -- .NET --, therefor.

Signed and Sealed this
Eighteenth Day of February, 2014

Michelle K. Lee
*Deputy Director of the United States Patent and Trademark Office*